US008377528B2

(12) United States Patent
Kyle et al.

(10) Patent No.: US 8,377,528 B2
(45) Date of Patent: *Feb. 19, 2013

(54) ADDITIVE DELIVERY LAMINATE, PROCESS FOR MAKING AND USING SAME AND ARTICLE EMPLOYING SAME

(75) Inventors: David R. Kyle, Moore, SC (US); Steven T. Calvert, Simpsonville, SC (US); Hillary Crawford, Simpsonville, SC (US); David Herndon, Moore, SC (US); Milissa Smith, Greer, SC (US)

(73) Assignee: Cryovac, Inc., Duncan, SC (US)

( * ) Notice: Subject to any disclaimer, the term of this patent is extended or adjusted under 35 U.S.C. 154(b) by 2074 days.

This patent is subject to a terminal disclaimer.

(21) Appl. No.: 11/187,802

(22) Filed: Jul. 22, 2005

(65) Prior Publication Data

US 2006/0172096 A1 Aug. 3, 2006

Related U.S. Application Data

(60) Provisional application No. 60/590,826, filed on Jul. 22, 2004.

(51) Int. Cl.
*B32B 1/08* (2006.01)
*B32B 27/20* (2006.01)
*A23B 4/18* (2006.01)

(52) U.S. Cl. .......... 428/35.2; 428/35.7; 99/494

(58) Field of Classification Search .......... 428/35.2, 428/35.7, 34.3; 426/623, 805; 99/494
See application file for complete search history.

(56) References Cited

U.S. PATENT DOCUMENTS

| | | | |
|---|---|---|---|
| D729,548 | | 4/1969 | Klug |
| 3,471,303 A | | 10/1969 | Hamdy |
| 3,471,304 A | | 10/1969 | Hamdy |
| 3,819,552 A | * | 6/1974 | Glanville et al. ............ 524/271 |
| 4,064,296 A | | 12/1977 | Bornstein et al. |
| 4,092,282 A | * | 5/1978 | Callan ........................ 524/271 |
| 4,287,151 A | | 9/1981 | Esakov et al. |
| 4,377,187 A | | 3/1983 | Chiu |
| 4,408,000 A | * | 10/1983 | Lee .............................. 524/315 |
| 4,431,032 A | | 2/1984 | Nicholson |
| 4,431,033 A | | 2/1984 | Nicholson |
| 4,505,939 A | | 3/1985 | Chiu |
| 4,518,619 A | | 5/1985 | Chiu |
| 4,525,397 A | | 6/1985 | Chiu |
| 4,540,613 A | | 9/1985 | Nicholson et al. |

(Continued)

FOREIGN PATENT DOCUMENTS

DE 102 44 088.3 * 4/2004
EP 0 408 164 A2 1/1991

(Continued)

OTHER PUBLICATIONS

DE 10244088 Certified Translation Apr. 2004.*

(Continued)

*Primary Examiner* — Erik Kashnikow
(74) *Attorney, Agent, or Firm* — Rupert B. Hurley, Jr.

(57) ABSTRACT

An additive delivery laminate, suitable for cooking a food product and transferring a colorant, flavorant, and/or odorant to a food product, has an additive delivery layer comprising a thermoplastic layer and water-soluble granules containing a food additive. The laminate further comprises a substrate layer to which the additive delivery layer is bonded. The additive delivery layer is placed in contact with the food product to be packaged, with the granules thereafter dissolving and the additive being transferred to the food product. The additive can be transferred during cook-in or otherwise. Also disclosed is a process for preparing the additive delivery laminate and a process for preparing a packaged food product.

23 Claims, 4 Drawing Sheets

U.S. PATENT DOCUMENTS

| | | | |
|---|---|---|---|
| 4,604,304 A | 8/1986 | Faraone et al. | |
| 4,874,622 A | 10/1989 | Gaynor et al. | |
| 4,889,751 A | 12/1989 | Hansen et al. | |
| 4,898,752 A | 2/1990 | Cavagna et al. | |
| 4,933,217 A | 6/1990 | Chiu | |
| 4,973,486 A * | 11/1990 | Matsumoto et al. | 426/548 |
| 4,985,260 A | 1/1991 | Niaura et al. | |
| 5,021,252 A | 6/1991 | Huang et al. | |
| 5,032,416 A | 7/1991 | Niaura et al. | |
| 5,288,532 A | 2/1994 | Juhl et al. | |
| 5,334,404 A | 8/1994 | Garcia et al. | |
| 5,374,457 A | 12/1994 | Juhl et al. | |
| 5,382,391 A | 1/1995 | Juhl et al. | |
| 5,384,160 A | 1/1995 | Frazzitta | |
| 5,505,775 A | 4/1996 | Kitos | |
| 5,520,739 A | 5/1996 | Frazzitta | |
| 5,580,409 A * | 12/1996 | Andersen et al. | 156/210 |
| 5,705,214 A | 1/1998 | Ito et al. | |
| 5,741,533 A | 4/1998 | Lorenzo Moore et al. | |
| 5,843,502 A | 12/1998 | Ramesh | |
| 6,032,701 A | 3/2000 | Kearby et al. | |
| 6,117,464 A | 9/2000 | Moore et al. | |
| 6,125,751 A | 10/2000 | Korem | |
| 6,180,150 B1 | 1/2001 | Schafer | |
| 6,196,960 B1 | 3/2001 | Owensby | |
| 6,200,613 B1 | 3/2001 | Schafer et al. | |
| 6,329,465 B1 * | 12/2001 | Takahashi et al. | 525/191 |
| 6,583,188 B2 * | 6/2003 | Chaudhary et al. | 521/60 |
| 6,589,615 B1 | 7/2003 | Yen | |
| 6,667,082 B2 | 12/2003 | Bamore et al. | |
| 6,764,729 B2 | 7/2004 | Ramesh et al. | |
| 6,893,671 B2 | 5/2005 | Ben-Yoseph et al. | |
| 6,903,841 B2 | 6/2005 | Spurgeon et al. | |
| 7,256,238 B2 * | 8/2007 | Kubo et al. | 525/88 |
| 2001/0008658 A1 | 7/2001 | Barmore et al. | |
| 2003/0124228 A1 | 7/2003 | Goto et al. | |
| 2005/0214414 A1 | 9/2005 | Miranda et al. | |
| 2006/0003058 A1 * | 1/2006 | Koenig et al. | 426/135 |

FOREIGN PATENT DOCUMENTS

| | | |
|---|---|---|
| EP | 1252828 | 10/2002 |
| GB | 874735 | 9/1958 |
| JP | 49-15766 | 2/1974 |
| WO | 98/31731 | 7/1998 |
| WO | 2004/003264 A1 | 1/2004 |
| WO | 2004/028258 A1 | 4/2004 |
| WO | 2005/036975 A1 | 4/2005 |

OTHER PUBLICATIONS

ASTM D 2732, 1990 Annual Book of ASTM Standards, vol. 08.03, pp. 368-371, 1989.

"FDA Compliant Integrated Food Imaging System", Merlin FG, Spectra Technology Integration, Jun. 22, 2005.

One Source One Call One Company, Vector Packaging, Brochure.

U.S. Appl. No. 08/617,720, filed Apr. 1, 1996, Beckwith.

* cited by examiner

Process of Applying Additive Delivery Slurry
to Produce Additive Delivery Laminate // ADDITIVE DELIVERY LAMINATE, PROCESS FOR MAKING AND USING SAME AND ARTICLE EMPLOYING SAME

CROSS-REFERENCE TO RELATED APPLICATION

This application claims priority from parent U.S. Ser. No. 60/590,826, filed 22 Jul. 2004, which is hereby incorporated, in its entirety, by reference thereto.

FIELD OF THE INVENTION

The present invention relates generally to packaging, and more specifically to thermoplastic laminates, and methods of using same especially to package and heat or cook a food product to deliver enhanced flavor, aroma, and/or color to the food product.

BACKGROUND OF THE INVENTION

The commercial food packaging industry has for many years carried out processes in which a food additive is used to modify a food product by imparting a desired color, flavor, or odor to the product. In the meat industry, this has included modification of a meat product during cooking of the meat. Typically, smoke flavor and color, and caramel coloring, having been used to modify the meat product.

There remains a need to improve the manner in which color, flavor, and odor food additives are combined with food products, and to improve the quality of the resulting modified food product. Problems experienced in the prior art include, among others, uneven distribution of the food additive in or on the food product, inability to transfer enough food additive to the food product, inadequate adhesion of the food additive to the food product upon removing the package from the food product, and poor appearance of the food product after transfer of the food additive to the food product. It would be desirable to provide a process or product which addresses one or more of these areas.

SUMMARY OF THE INVENTION

As a first aspect, the present invention is directed to a laminate comprising a substrate layer and an additive delivery layer. The additive delivery layer comprises a thermoplastic polymer and water-soluble granules. The water-soluble granules comprise at least one member selected from the group consisting of colorant, flavorant, and odorant. The water-soluble granules form at least a portion of a surface of the additive layer which is opposite the substrate layer.

As a second aspect, the present invention is directed to a packaging article comprising the laminate according to the first aspect of the present invention. In the packaging article, the laminate is adhered to itself or another component of the packaging article. Preferred packaging articles include bag, pouch, casing, tray, and lidding film. Preferred casings include seamless casing, fin-sealed backseamed casing, lap-sealed backseamed casing, and butt-sealed backseamed casing with backseaming tape thereon.

As a third aspect, the present invention is directed to a laminate suitable for cooking foods. The laminate comprises a substrate layer and an additive delivery layer. The additive delivery layer comprises a thermoplastic polymer and water-soluble granules. The water-soluble granules comprise at least one additive selected from the group consisting of colorant, flavorant, and odorant. The additive is present in an amount sufficient to impart color, flavor, and/or odor to a food when the laminate contacts the food product during elevated temperature processing of the food product.

As a fourth aspect, the present invention is directed to a process for preparing a laminate. The process comprises dispersing water-soluble granules into a polymer solution comprising a thermoplastic polymer and an organic solvent. The thermoplastic polymer can optionally be dissolved in the organic solvent by heating with or without stirring and/or agitation. The granules comprise at least one member selected from the group consisting of colorant, flavorant, and odorant. Dispersing the water-soluble granules into the polymer solution is carried out to produce an additive delivery slurry. The additive delivery slurry is deposited onto a substrate. The organic solvent is evaporated from the additive delivery slurry, to form a laminate having a substrate layer and an additive delivery layer, with the additive delivery layer comprising the water-soluble granules.

As a fifth aspect, the present invention pertains to a process for preparing a cooked food product, comprising packaging a food product in a packaging article comprising a laminate. The laminate comprises a substrate layer and an additive delivery layer. The additive delivery layer comprises a thermoplastic polymer and water-soluble granules. The water-soluble granules contain a food additive comprising at least one member selected from the group consisting of colorant, flavorant, and odorant. The water-soluble granules form at least a portion of a surface of the additive delivery layer which is opposite the substrate layer. The food product is packaged so that the additive delivery layer is between the food product and the substrate layer, with at least a portion of the food additive being transferred to the food product. One preferred manner of transferring food additive to the food product is by heating the packaged food product to a temperature of from 45° C. to 200°, so that at least a portion of the additive is delivered to the food product.

The laminate of the present invention can be manufactured using a modified printing or coating process. The additive delivery coating can be applied to a film substrate using printing technology, such as gravure coating or printing, lithographic coating or printing, flood coating followed by metering with a doctor blade, spray coating, etc. Preferably, the coating composition is applied to the film using at least one member selected from the group consisting of gravure roll, flexographic roll, Meyer rod, reverse angle doctor blade, knife over roll, two roll reverse, three roll reverse, comma roll, and lip coating.

The additive delivery coating can even be applied to a portion of the substrate film, or applied to the substrate in a pattern, i.e. a logo, grill marks, etc., leaving no coating on areas of the substrate to be heat sealed. In one embodiment, the additive delivery coating can be formulated with a thermoplastic elastomeric polymer that adheres to the film substrate layer without need of any preparation of the surface of the film.

Preferably, the article comprises at least one member selected from the group consisting of a bag, a backseamed casing, a pouch, and a thermoformed article. More preferably, the article comprises at least one member selected from the group consisting of fin-sealed backseamed casing, lap-sealed backseamed casing, butt-sealed backseamed casing, side-seal bag, end-seal bag, pouch, and perimeter sealed thermoformed article.

DETAILED DESCRIPTION OF THE INVENTION

Figure 1:
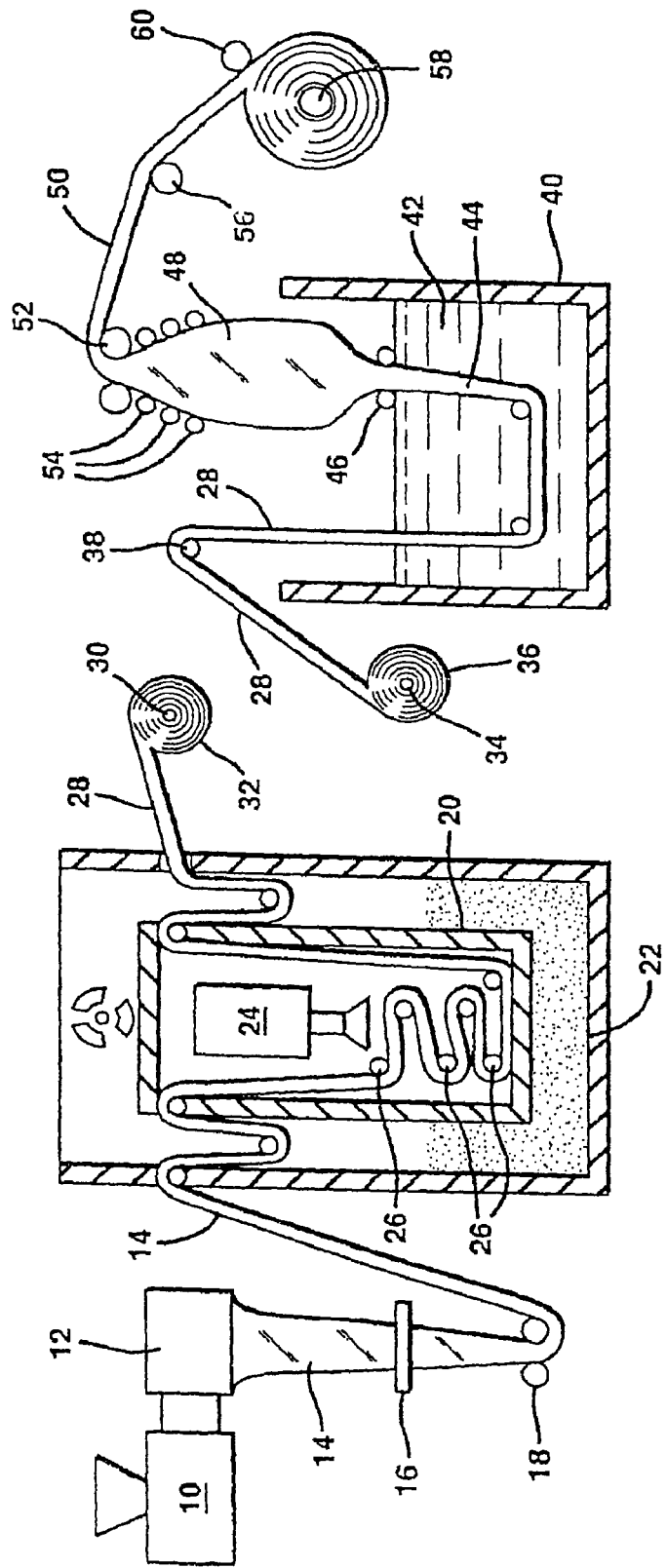
FIG. 1 illustrates a schematic view of a process for making a substrate film in accordance with the present invention.

The phrase "additive delivery layer" refers to a layer of the laminate which contains both the thermoplastic polymer and the water-soluble granules. In operation, the granules in the additive delivery layer dissolve and transfer the food additive to the food product. The additive delivery layer is preferably prepared by depositing an "additive delivery coating" onto a substrate layer (which can, for example, be a film, either monolayer or multilayer). The phrase "additive delivery coating" refers to the thermoplastic polymer of the additive delivery layer and the granules, and in addition the organic solvent in which the thermoplastic polymer is dissolved. After the additive delivery coating is deposited onto the substrate, the organic solvent is evaporated, leaving the additive delivery coating affixed on the substrate.

While the thermoplastic polymer of the additive delivery layer can comprise (or be selected only from) one or more water-soluble polymers, preferably, the thermoplastic polymer of the additive delivery layer comprises at least one water-insoluble polymer. More preferably, all of the polymer in the additive delivery layer is water-insoluble polymer. If a blend of water-soluble and water-insoluble polymer is present in the additive delivery layer, preferably the amount of water soluble polymer is less than 50 percent, based on total polymer weight in the additive delivery layer, more preferably less from 1 to 40 percent, from 1 to 20 percent, and from 1 to 10 percent.

The polymeric materials useful in making the additive delivery layer include thermoplastic polymers, elastomers, and thermoplastic elastomers selected from the group consisting of butadiene/styrene rubber, isobutylene/isoprene copolymer, polyisoprene, polyisobutylene, polybutylene, styrene/isobutylene copolymer, ethylene/vinyl acetate copolymer, ethylene/vinyl alcohol copolymer, ethylene/propylene copolymer, propylene/ethylene copolymer, polypropylene, polybutadiene, polyethylene, ethylene/alpha-olefin copolymer, ethylene/cyclo-olefin copolymer, polyvinyl acetate, cellulose triacetate, natural rubber, chicle, balata rubber, and mixtures thereof.

The additive delivery layer may optionally further comprise processing aids to improve release of the porous additive delivery coating from the cooked food product, reduce adhesion of the coated surface of the laminate to an outer layer surface when the laminate is wound into a roll for storage, and improve the coefficient of friction (prevent blocking) of the coated laminate during any manufacture and packaging operation. Processing aids include but not limited to, various types of waxes, (including petroleum wax, paraffin, edible waxes, bees wax, microcrystalline waxes, polyolefin waxes, amide waxes, oxidized polyethylene), various oils (including silicone oil, mineral oil, vegetable oil, lard), edible surfactants, and anti-fog agents. Processing additives, well known to those skilled in the art may be added to the coating slurry prior to applying to the substrate, without impacting the desired adhesion, abuse resistance and good flavor transfer to the meat at cook in conditions. Optionally, the additive delivery layer may comprise crosslinked polymer, e.g., may be crosslinked chemically or be subjected to irradiation to crosslink the polymer, etc.

Organic solvents useful in making the coating slurry include volatile hydrocarbon fluids selected from the group consisting of $C_5$ to $C_{12}$ alkanes and alkenes, aliphatic alcohols selected from the group consisting of $C_3$ to $C_6$ alcohols, ketones selected from the group consisting of $C_3$ to $C_5$ aliphatic ketones, and $C_3$ to $C_{12}$ organic esters. While the additive delivery layer can be an outer layer of the laminate, optionally, the additive delivery laminate can further comprise an overcoat layer, i.e., a layer applied over the additive delivery layer. The overcoat layer is water-soluble, and preferably comprises at least one member selected from the group consisting of polysaccharide and protein. More particularly, the overcoat layer comprises at least one member selected from the group consisting of alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, and chitosan, gliadin, glutenin, globulin, albumin (especially in the form of gluten), prolamin (especially corn zein), thrombin, pectin, canageenan, konjac flour-glucomannin, fibrinogen, casein (especially casein milk protein), soy protein, whey protein (especially whey milk protein), and wheat protein. The overcoating layer is optionally applied to assist in "clean" separation of the porous additive delivery coating from the food during the step of stripping away the laminate following heat processing.

As used herein, the phrase "substrate layer" refers to the layer of the laminate which supports the additive delivery layer. Although the substrate layer can be any article to which the additive delivery layer can be adhered, a preferred additive delivery layer is a thermoplastic article or a cellulosic article. A flexible film is a preferred article. The film can be a monolayer film or a multilayer film. Preferably, the substrate layer can be heat sealed.

Preferably, the substrate layer comprises at least one member selected from the group consisting of polyolefin, polyethylene, ethylene/alpha-olefin copolymer, polypropylene, propylene/alpha-olefin copolymer, ethylene/vinyl acetate copolymer, ethylene/unsaturated ester copolymer, ethylene/alpha, beta-unsaturated carboxylic acid, ethylene/alpha, beta-unsaturated carboxylic acid anhydride, metal base neutralized salt of ethylene/alpha, beta-unsaturated carboxylic acid, ethylene/cyclo-olefin copolymer, ethylene/vinyl alcohol copolymer, polyamide, co-polyamide, polyester, co-polyester, polystyrene, polyvinylchloride, polyacrylonitrile, polyurethane, and cellulose.

Film substrates onto which the additive delivery layer is applied may include one or more additional layers, depending on the properties required of the film. Preferred substrates are multilayer films, designed to achieve slip, modulus, oxygen barrier, and heat sealability. Polymers useful in making the first layer of a multilayer substrate film include polyolefin, vinylidene chloride copolymer (including vinylidene chloride/vinyl chloride copolymer and vinylidene chloride/methyl acrylate copolymer), ethylene homopolymer and copolymer (particularly ethylene/alpha-olefin copolymer), propylene homopolymer, polybutene, butene/alpha-olefin copolymers, ethylene/unsaturated ester copolymer (particularly ethylene/vinyl acetate copolymer), ethylene/unsaturated acid copolymer (particularly ethylene/acrylic acid copolymer), ethylene/vinyl alcohol copolymer, polyamide, co-polyamide, polyester, co-polyester, and ionomer.

Heat sealable substrate layers in accordance with this invention include high density polyethylene (HDPE), high pressure low density polyethylene (LDPE), ethylene/alpha-olefin copolymers (LLDPE and VLDPE), single-site catalyzed ethylene/alpha-olefin copolymers (linear homogeneous and long chain branched homogeneous ethylene/$C_3$-$C_{10}$ alpha-olefin copolymers), interpenetrating network polymers (IPNs), substantially spherical homogeneous polyolefins (SSHPEs), polypropylene, polybutylene, butene/alpha-olefin copolymers, propylene/ethylene copolymer, and propylene/hexene/butene terpolymer. Additional film layers may be applied to the un-coated side of the substrate layer. For instance, oxygen barrier layers as for example ethylene/vinyl alcohol copolymer or vinylidene chloride copolymer may be utilized behind the coating face of the substrate. Multiply substrate films useful in practicing the invention would include for example a first substrate layer of LLDPE, a second blend layer of 85% EVA and 15% HDPE, a third tie layer of maleic anhydride grafted-LLDPE, a fourth layer of ethylene/vinyl alcohol copolymer, a fifth blend layer of 50% nylon 6 and 50% 6/12 copolyamide, a sixth tie layer of maleic anhydride grafted-LLDPE, a seventh blend layer of 85% EVA and 15% HDPE, and an eighth outer layer of LLDPE. In such an example, layers 2-8 provide the substrate film with oxygen barrier and strength properties in addition to the heat seal property of the first substrate layer.

As used herein, the term "colorant" refers to a substance imparts color to a product which otherwise would have a different appearance. The term "colorant" is considered to be synonymous with the noun "coloring". The term "colorant" is inclusive of the various FD&C approves colorants, together with various other colorants. Preferably, the colorant comprises at least one member selected from the group consisting of caramel, maltose, beet powder, spice, soy granules, iron oxide, grape color extract, and carotene.

As used herein, the term "flavorant" refers to a substance which affects the sense of taste, and is synonymous with the noun "flavor", and includes particulate flavornt additive, or multiple additives, that modify the flavor of a food composition. Flavorant includes, but is not limited to, spices (dehydrated garlic, mustard, herbs), seasoning agents (honey mustard, cumin, paprika, chili, lemon, ginger, coriander, barbecue, dehydrated soy), baked, grilled, or roasted flavor components, dehydrated honey, dehydrated vegetable flavorants (tomato, onion, jalapeno, cayenne, chipotle chile, black pepper, habaneros), sea salt, and smoke flavorant (dehydrated hickory, applewood, or mesquite smoke). Flavorant may be obtained from suppliers such as Gold Coast, Red Arrow, or Master Taste.

As used herein, the term "odorant" refers to an odorous substance, i.e., a substance having an emission which stimulates the olfactory organ. Preferred odorants include those which emit a pleasant aroma (such as a fragrance), or a savory aroma.

As used herein, the term "granule", "granular", or "granular agent", comprises agglomerates as well as single particles. Granule herein refers to particles of a flavorant, odorant, and/or colorant exhibiting a size range of between about 10 and 500 microns, such as between 15 and 300 microns, such as between 50 and 250 microns, such as between 70 and 200, or such as between 75 and 150 microns. Those of skill in the art appreciate that flavor particles may be useful in larger or smaller sizes, for instance cracked pepper can be larger than 500 micron. Granules as used herein include fine additive particles such as powders.

Preferably, the granules extend above that surface of the thermoplastic polymer of the additive delivery layer which is opposite the substrate layer. While some of the granules may be adhered or embedded to the outer surface of the thermoplastic polymer of the additive delivery layer, other granules may be embedded underneath the outer surface(s) of the thermoplastic polymer of the additive delivery layer. A fully embedded granule which is water-soluble will dissolve from within the additive delivery layer if the water can reach the granule. It may require the dissolution of part or all of an adjacent granule in order for the water to reach a fully embedded granule. A granule which is completely surrounded by the thermoplastic polymer may not dissolve if the thermoplastic polymer does not allow water to reach the embedded granule. Nevertheless, many if not most of the granules will dissolve if a high loading of granules is present in the additive delivery layer.

The color, aroma, and flavor granules as used herein refer to additives that modify the flavor, aroma, and color of a food composition, including but not limited to spices (such as dehydrated garlic, onion, mustard, herbs), seasoning agents (such as dehydrated honey, dehydrated soy sauce, cumin, chili, curry powder, dehydrated lemon, ginger, coriander), flavor concentrates (such as barbecue, grilled, baked, roasted flavor), dehydrated vegetable flavors (such as tomato, jalapeno, cayenne, chipotle, paprika habaneros), sea salt, and smoke flavor concentrates (such as glycoaldehyde, 2,6-dimethoxyphenol, guaiacol, or dehydrated hickory, applewood, and mesquite smoke), caramel, maltose, maltodextrin, beet powder, iron oxide, grape color extract, and carotene. Suppliers of color and flavor granules include vendors such as Gold Coast, Red Arrow, and Master Taste.

The term "porous" is used herein with respect to the additive-delivery layer. A porous additive delivery layer is a layer having openings or pathways into and/or through the layer, these openings allowing the additive granules in the coating matrix to be extracted by water, water vapor, and food liquids. The relative surface tensions of the liquid, the presence of a water-insoluble thermoplastic polymer in the additive delivery layer, and the diameter of the granules, allow water vapor and liquid to enter coating pores immediately present, or create pores as water soluble granules are etched away by the water vapor and fluid.

A relatively high loading of water soluble granules in thermoplastic polymer, for example 20% to 60% by weight, based on weight of thermoplastic polymer, is preferably prepared by first dissolving the thermoplastic polymer in an organic solvent, and thereafter adding the granules to the solution to make a slurry comprising the water-soluble granules dispersed in the solution of the thermoplastic water insoluble polymer. This slurry, when applied to the substrate followed by evaporation of the organic solvent, produces a coating on the substrate which becomes the additive delivery layer of the resulting laminate. The evaporation of the organic solvent results in a continuous matrix of the thermoplastic polymer, in which some of the water-soluble granules are embedded below the surface of the thermoplastic polymer, while other water-soluble granules are adhered to the surface of the thermoplastic polymer, these granules projecting above the outer surface of the thermoplastic polymer. All of the exposed water-soluble granules are accessible to infusion by moisture (i.e., moisture permeable), as well as being soluble in the moisture, during elevated heat processing of a food product which is packaged in the laminate with the coating against the food product. Water-soluble granules that are partly or fully dissolved while in contact with a moisture-containing food product transfer additive to the food product. The process of additive delivery to the food product is particularly and by reducing in size allow moisture to reach subsurface granules which are then partially or wholly dissolved by the water As used herein, the term "film" is used in a generic sense to include plastic web, regardless of whether it is film or sheet. Preferably, films of and used in the present invention have a thickness of 0.25 mm or less. As used herein, the term "package" refers to packaging materials configured around a product being packaged. The phrase "packaged product," as used herein, refers to the combination of a product that is surrounded by a packaging material.

As used herein, the phrase "laminate" refers to an article having at least two layers. Examples include multilayer film, such as coextruded multilayer film, extrusion coated multilayer film, a monolayer film having a coating thereon, and a multilayer film having a coating thereon, two films bonded with heat or an adhesive, etc. A preferred laminate comprises a substrate layer which is an outer layer comprising a thermoplastic polymer, and an additive delivery layer, the additive delivery layer comprising a water insoluble thermoplastic polymer impregnated with granules comprising water soluble colorant, water-soluble odorant, and/or water-soluble flavorant. The substrate layer of the laminate is preferably directly adhered to the additive delivery layer. The substrate film can optionally contain one or more additional film layers, such as an oxygen-barrier layer with or without tie layers in association therewith, additional bulk and/or strength layers, etc. The additive delivery layer is preferably a water permeable layer, i.e. a porous layer, permitting extraction of additives from the porous layer for delivery to an adjacent packaged food. The second additive delivery layer is preferably applied as a coating onto the first substrate film layer.

As used herein, the phrase "outer layer" refers to any film layer having less than two of its principal surfaces directly adhered to another layer of the film. The phrase is inclusive of monolayer and multilayer films. All multilayer films have two, and only two, outer layers, each of which has a principal surface adhered to only one other layer of the multilayer film. In monolayer films, there is only one layer, which, of course, is an outer layer in that neither of its two principal surfaces is adhered to another layer of the film.

As used herein, the phrase "drying," as used with reference to the process according to the present invention, refers to the removal of the organic solvent from the additive slurry to form a coating which forms one outer layer of the laminate of the invention. Preferably, drying prevents the outer layer of the film from exhibiting substantial blocking, i.e., sticking to a degree that blocking or delamination occurs, with respect to adjacent surfaces of, for example, a film (including both the same or another film), and/or other articles (e.g., metal surfaces, etc.). Preferably, the outer layer has a hydrocarbon solvent content of less than about 5 percent, based on the weight of the outer layer; more preferably, from about 0.0001 to 5 percent; still more preferably, from about 0.0001 to 1 percent; yet more preferably, about 0 percent.

As used herein, the term "seal" refers to any seal of a first region of a film surface to a second region of the same or another film surface, the seal typically formed by heating film regions to at least their respective seal initiation temperatures. The sealing can be performed by any one or more of a wide variety of manners, such as using a heated bar, hot air, infrared radiation, ultrasonic sealing, etc., and even the use of clips on, for example, a shirred casing, etc.

As used herein, the phrase "cook-in" refers to the process of cooking a product packaged in a material capable of withstanding exposure to long and slow cooking conditions while containing the food product. The cooked product can be distributed to the customer in the original package, or the packaging material can be removed and the food portioned for repackaging. Cook-in includes cooking by submersion in water at 57° C. to 85° C. for 2-12 hours, or by submersion in water or immersion in pressurized steam (i.e. retort) at 85° C. to 121° C. for 2-12 hours, using a film suitable for retort end-use. However, cook-in can include dry heat, i.e. conventional oven temperatures of 300° F. to 450° F., or microwave cooking, steam heat, or immersion in water at from 135° F. to 212° F. for 2-12 hours. Cooking often involves stepped heat profiles.

Preferably, the food is cooked at a temperature of from about 145° F. to 205° F. for a duration of from about 1 to 12 hours. Alternatively, the food product can be cooked at a temperature of from about 170° F. to 260° F. for a duration of from about 1 to 20 minutes, followed by cooking the food product at a temperature of from about 145° F. to 205° F. for a duration of from about 1 to 12 hours.

Preferably, the food product comprises at least one member selected from the group consisting of beef, pork, chicken, turkey, fish, cheese, tofu, and meat-substitute.

Cook-in packaged foods are essentially pre-packaged, pre-cooked foods that may be directly transferred to the consumer in this form. These types of foods may be consumed with or without warming. Cook-in packaging materials maintain seal integrity, and in the case of multilayer films are delamination resistant. In certain end-uses, such as cook-in casings, the laminate is heat-shrinkable under cook-in conditions so as to form a tightly fitting package. Additional optional characteristics of films for use in cook-in applications include delamination-resistance, low $O_2$-permeability, heat-shrinkability representing about 20-50% biaxial shrinkage at about 185° F., and optical clarity.

During cook-in, the package should maintain seal integrity, i.e., any heat-sealed seams should resist rupture during the cook-in process. Typically, at least one portion of a cook-in film is heat sealable to another portion to form a backseamed tubular casing, or a seamless tubing is used if a seamless casing is being used. Typically, each of the two ends of the tubular casing are closed using a metal clip. The casing substantially conforms to the product inside the casing. Substantial conformability is enhanced by using a heat-shrinkable film about the package contents so as to form a tightly fitting package. In some embodiments, the film is heat-shrinkable under time-temperature conditions of cook-in, i.e., the film possesses sufficient shrink energy such that exposure of the packaged food product to heat will shrink the packaging film snugly around the packaged product, representatively up to about 55% monoaxial or biaxial shrinkage at 185° F. In this manner, product yield is increased by the food product retaining moisture, and the aesthetic appearance of the packaged product is not diminished by the presence of the surface fluids or "purge".

As used herein, the phrase "elevated temperature" as regards the process of heat processing a packaged food product above ambient temperature to initiate the delivery of granular additives, refers to the heat treating of a packaged food above ambient temperature in a material capable of withstanding exposure to heat and time conditions while containing the food product, for example heating from 45° C. to 250° C., such as from 50° C. to 200° C., or from 55° C. to 150°

C., or 57° C. to 125° C., or 60° C. to 115° C., or 65° C. to 100° C., or such as 70° C. to 85° C. Elevated temperature processing of a packaged food may included stepped heat profiles, for example heating at 57° C. or 30 minutes, followed by heating at 60° C. for 30 minutes, followed by heating to 75° C. until reaching the desired internal food temperature.

As used herein, the term "barrier", and the phrase "barrier layer", as applied to films and/or film layers, are used with reference to the ability of a film or film layer to serve as a barrier to one or more gases.

As used herein, the phrases "seal layer," "sealing layer," "heat seal layer," and "sealant layer," refer to an outer film layer, or layer surface, involved in the sealing of laminate or film to itself, another film layer of the same laminate, or another film, and/or another article which is not a film.

As used herein, the term "polyolefin" refers to any polymerized olefin, which can be linear, branched, cyclic, aliphatic, substituted, or unsubstituted. Exemplary polyolefins include homopolymers of one or more olefins, copolymers of olefin, copolymers of an olefin and an non-olefinic comonomer copolymerizable with the olefin, such as vinyl monomers, modified polymers thereof, and the like. More specific examples include polyethylene homopolymer, polypropylene homopolymer, polybutene, ethylene/alpha-olefin copolymer, propylene/alpha-olefin copolymer, butene/alpha-olefin copolymer, ethylene/vinyl acetate copolymer, ethylene/vinyl alcohol copolymer, ethylene/ethyl acrylate copolymer, ethylene/butyl acrylate copolymer, ethylene/methyl acrylate copolymer, ethylene/acrylic acid copolymer, ethylene/methacrylic acid copolymer, modified polyolefin resin, ionomer resin, polymethylpentene, etc. Modified polyolefin resin is inclusive of modified polymer prepared by copolymerization of the olefin with an unsaturated carboxylic acid, e.g., maleic acid, fumaric acid or the like, or a derivative thereof such as the anhydride, ester or metal salt or the like, or by incorporating into an olefin homopolymer or copolymer, an unsaturated carboxylic acid, e.g., maleic acid, fumaric acid or the like, or a derivative thereof such as the anhydride, ester or metal salt or the like.

As used herein, the phrases "ethylene alpha-olefin copolymer", and "ethylene/alpha-olefin copolymer", refer to such heterogeneous materials as low density polyethylene (LDPE), medium density polyethylene (MDPE), linear low density polyethylene (LLDPE), and very low and ultra low density polyethylene (VLDPE and ULDPE); as well as to such homogeneous ethylene/alpha olefin copolymers as: metallocene-catalyzed EXACT™ linear homogeneous ethylene/alpha olefin copolymer resins obtainable from the Exxon Chemical Company, of Baytown, Tex., long chain branched homogeneous (substantially linear) ethylene/alpha-olefin copolymers (e.g., copolymers known as AFFINITY™ resins, available from the Dow Chemical Company, of Midland, Mich.), as well as TAFMER™ linear homogeneous ethylene/alpha-olefin copolymer elastomer resins obtainable from the Mitsui Petrochemical Corporation. LLDPE has a density usually in the range of from about 0.91 grams per cubic centimeter to about 0.94 grams per cubic centimeter.

As used herein, terms identifying polymers, such as "polyamide", "polyester", "polyurethane", etc. are inclusive of not only polymers comprising repeating units derived from monomers known to polymerize to form a polymer of the named type, but are also inclusive of comonomers, derivatives, etc. which can copolymerize with monomers known to polymerize to produce the named polymer. For example, the term "polyamide" encompasses both polymers comprising repeating units derived from monomers, such as caprolactam, which polymerize to form a polyamide, as well as copolymers derived from the copolymerization of caprolactam with a comonomer which when polymerized alone does not result in the formation of a polyamide.

Laminates useful in the present invention may include monolayer or multilayer substrate films. The substrate film may have a total of from 1 to 20 layers; such as from 2 to 12 layers; or such as from 4 to 9 layers. The substrate film can have any total number of layers and any total thickness desired, so long as the substrate provides the desired properties for the particular packaging operation in which the film is used, e.g. $O_2$-barrier characteristics, free shrink, shrink tension, optics, modulus, seal strength, etc.

As used herein, the phrases "inner layer" and "inside layer" refer to an outer film layer, of a laminate packaging film contacting a product, or an article suitable for use in packaging a product (such as a bag or casing), which is closest to the product, relative to the other layers of the multilayer film.

As used herein, the phrase "outside layer" refers to the outer layer, of a multilayer film or laminate packaging a product, or an article suitable for use in packaging a product (such as a bag or casing), which is furthest from the product relative to the other layers of the multilayer film.

As used herein, the phrase "tie layer" refers to any inner film layer having the primary purpose of adhering two layers to one another. Tie layers can comprise any polymer having a polar group thereon, or any other polymer that provides sufficient interlayer adhesion to adjacent layers comprising otherwise non-adhering polymers. Suitable polymers include polyolefins, such as those incorporating acids, esters, anhydrides or salts of carboxylic acids; and polar, non-polyolefinic materials such as polyesters, ethylene vinyl alcohol copolymer, etc.

As used herein, the phrase "free shrink" refers to the percent dimensional change in a 10 cm×10 cm specimen of film, when shrunk at 185° F., with the quantitative determination being carried out according to ASTM D 2732, as set forth in the 1990 *Annual Book of ASTM Standards*, Vol. 08.02, pp. 368-371, which is hereby incorporated, in its entirety, by reference thereto. A heat-shrinkable film has a free shrink of from about 5-70 percent each direction (i.e., from about 5 to 70 percent in the longitudinal (L) and from about 5 to 70 percent the transverse (T) directions) at 90° C., or at least 10 percent at 90° C. in at least one direction; such as from about 10-50 percent at 90° C.; or from about 15-35 percent at 90° C. For conversion to bags and casings, the film article is monoaxially oriented or biaxially oriented, and preferably has a free shrink, at 90° C., of at least 10 percent in each direction (L and T); such as at least 15 percent in each direction. For casing end use, a film has a total free shrink (L+T) of from about 30 to 50 percent at 85° C. For bag end-use, a film has a total free shrink of at least 50% (L+T), such as from 50 to 120%. Alternately, the oriented film article can be heat-set. Heat-setting can be done at a temperature from about 60-200° C., such as 70-150° C. and, such as 80-90° C.

In general, the substrate film used in the present invention can have any total thickness desired, so long as the film provides the desired properties for the particular packaging operation in which the film is used. Preferably, the substrate film used in the present invention has a total thickness, of from about 0.3 to about 15 mils; such as from about 1 to about 10 mils; or from about 1.5 to about 8 mils. For shrinkable casings, the range from 1.5-8 mils is an example of an acceptable substrate film thickness.

Exemplary substrates which can be coated with the porous additive delivery coating formulation in accordance with the present invention, which can thereafter be used in accordance with the present invention, include the films disclosed in: (a)

U.S. Ser. No. 669,728, filed Jun. 26, 1996, in the name of Ram K. Ramesh; (b) U.S. Ser. No. 08/539,919, filed Oct. 6, 1995, in the name of Ram K. Ramesh; (c) U.S. Pat. No. 6,117,464 in the name of Moore, issued Sep. 12, 2000; (d) U.S. Pat. No. 4,287,151, to ESAKOV, et. al., issued Sep. 1, 1981; and (e) U.S. Ser. No. 617,720, in the name of Beckwith et al., filed Apr. 1, 1996. Each of these documents is hereby incorporated in its entirety, by reference thereto.

The following multilayer structures are additive delivery laminates to the present invention. The "coating" layer is the additive delivery layer which contains the combination of the additive-containing granules and the thermoplastic polymer, and the layers other than the coating layer represents the substrate layer present in the laminate. In the following film structures, the individual layers are shown in the order in which they would appear in the film:

seal/coating (food-contact)
abuse/seal/coating (food-contact)
abuse/barrier/seal/coating (food-contact)
abuse/tie/barrier/tie/seal/coating (food-contact)
abuse/tie/barrier/tie/bulk/seal/coating (food-contact)
ABUSE/BULK/TIE/BARRIER/TIE/BULK/SEAL/coating (food-contact)

The foregoing representative film structures are intended to be illustrative only and not limiting in scope.

Preferably, the heat seal layer has a thickness of from about 0.1 to 4 mils; more preferably, from about 0.2 to about 1 mil; and, still more preferably, from about 0.3 to 0.8 mils. The outside abuse layer preferably has a thickness of from about 0.1 to 5 mils; more preferably, from 0.2 to 3 mil; still more preferably, from 0.3 to 2 mil; and yet still more preferably, about 0.5 to 1.5 mil. Preferably, the outside abuse layer comprises at least one member selected from the group consisting of polyolefin, polystyrene, polyamide, polyester, polymerized ethylene vinyl alcohol, polyvinylidene chloride, polyether, polyurethane, polycarbonate The substrate can optionally comprise an $O_2$-barrier layer. The $O_2$-barrier layer is an internal layer of a substrate that is between the seal layer and the abuse layer of the substrate material. The $O_2$-barrier layer comprises a polymer having relatively high $O_2$-barrier characteristics. Preferably, the $O_2$-barrier layer has a thickness of from about 0.05 to 2 mils; The $O_2$-barrier layer comprises at least one member selected from the group consisting of polymerized ethylene vinyl alcohol (EVOH), polyvinylidene chloride, polyamide, polyester and polyalkylene carbonate.

The substrate film according to the present invention may optionally further contain a tie layer, also referred to by those of skill in the art as an adhesive layer. The function of a tie layer is to adhere film layers that are otherwise incompatible in that they do not form a strong bond during coextrusion or extrusion coating. Tie layer(s) suitable for use in the film according to the present invention have a relatively high degree of compatibility with (i.e., affinity for) the $O_2$-barrier layer such as polymerized EVOH, polyamide, etc., as well as a high degree of compatibility for non-barrier layers, such as polymerized ethylene/alpha-olefin copolymers. In general, the composition, number, and thickness of the tie layer(s) is as known to those of skill in the art. Preferably, the tie layer(s) each have a thickness of from about 0.01 to 2 mils. Tie layer(s) each comprise at least one member selected from the group consisting of modified polyolefin, ionomer, ethylene/unsaturated acid copolymer, ethylene/unsaturated ester copolymer, polyamide, and polyurethane.

FIG. 1 illustrates a process for making a "substrate film" which can thereafter be coated so that it becomes a film in accordance with the present invention. In the process illustrated in FIG. 1, various polymeric formulations solid polymer beads (not illustrated) are fed to a plurality of extruders (for simplicity, only one extruder is illustrated). Inside extruders 10, the polymer beads are degassed, following which the resulting bubble-free melt is forwarded into die head 12, and extruded through an annular die, resulting in tubing tape 14 which is preferably from about 15 to 30 mils thick, and preferably has a lay-flat width of from about 2 to 10 inches.

After cooling or quenching by water spray from cooling ring 16, tubing tape 14 is collapsed by pinch rolls 18, and is thereafter fed through irradiation vault 20 surrounded by shielding 22, where tubing 14 is irradiated with high energy electrons (i.e., ionizing radiation) from iron core transformer accelerator 24. Tubing tape 14 is guided through irradiation vault 20 on rolls 26. Preferably, tubing tape 14 is irradiated to a level of from about 40-100 kGy, resulting in irradiated tubing tape 28. Irradiated tubing tape 28 is wound upon windup roll 30 upon emergence from irradiation vault 20, forming irradiated tubing tape coil 32.

After irradiation and windup, windup roll 30 and irradiated tubing tape coil 32 are removed and installed as unwind roll 34 and unwind tubing tape coil 36, on a second stage in the process of making the tubing film as ultimately desired. Irradiated tubing 28, being unwound from unwind tubing tape coil 36, is then passed over guide roll 38, after which irradiated tubing 28 is passed through hot water bath tank 40 containing hot water 42. Irradiated tubing 28 is then immersed in hot water 42 (preferably having a temperature of about 85° C. to 99° C.) for a period of about 20 to 60 seconds, i.e., for a time period long enough to bring the film up to the desired temperature for biaxial orientation. Thereafter, hot, irradiated tubular tape 44 is directed through nip rolls 46, and bubble 48 is blown, thereby transversely stretching hot, irradiated tubular tape 44 so that oriented film tube 50 is formed. Furthermore, while being blown, i.e., transversely stretched, nip rolls 52 have a surface speed higher than the surface speed of nip rolls 46, thereby resulting in longitudinal orientation. As a result of the transverse stretching and longitudinal drawing, oriented film tube 50 is produced, this blown tubing preferably having been both stretched in a ratio of from about 1:1.5 to 1:6, and drawn in a ratio of from about 1:1.5 to 1:6. More preferably, the stretching and drawing are each performed at a ratio of from about 1:2 to 1:4. The result is a biaxial orientation of from about 1:2.25 to 1:36, more preferably, 1:4 to 1:16. While bubble 48 is maintained between pinch rolls 46 and 52, trapped bubble 50 is collapsed by converging pairs of parallel rollers 54, and thereafter conveyed through pinch rolls 52 and across guide roll 56, and then rolled onto wind-up roll 58. Idler roll 60 assures a good wind-up.

Figure 2:
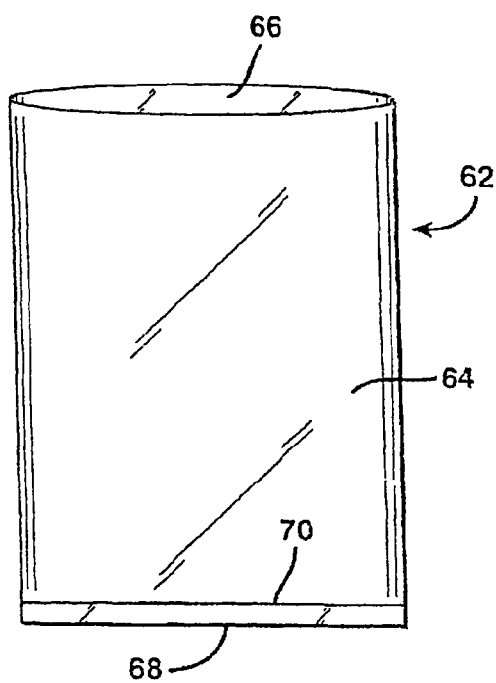
FIG. 2 illustrates a lay-flat view of a bag in accordance with the present invention.
Figure 3:
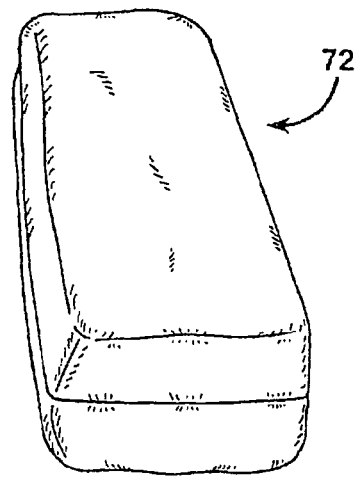
FIG. 3 illustrates a packaged product in accordance with the present invention.

FIG. 2 illustrates bag 62 in lay-flat configuration. Bag 62 is made from film 64, and has open top 66, as well as bottom 68 closed by end-seal 70. Bag 62 has an additive delivery coating on the inside surface thereof (not illustrated) the coating being the inside layer of film 64. An uncooked food product, such as a meat product, is placed inside bag 62, with bag 62 thereafter being evacuated and sealed, resulting in packaged meat product 72 illustrated in FIG. 3. The product, which is surrounded by the film, is thereafter cooked while remaining in the film. During cooking, the additive is delivered from the additive delivery layer of the laminate to the outer surface of the cooked product.

Figure 4:
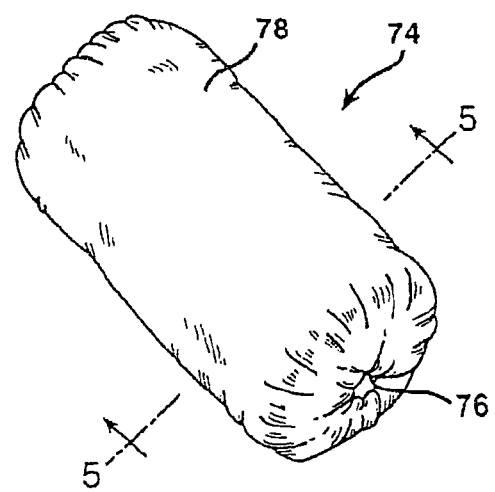
FIG. 4 illustrates a perspective view of an alternative packaged product in accordance with the present invention.

FIG. 4 illustrates another embodiment of a packaged product 74 of the present invention, the product being packaged in a casing closed by a pair of clips 76 at each end thereof, with only one clip being illustrated in the perspective view of FIG. 4. Film 78, used to package the meat product inside the casing, can be, for example, Film No. 1 or Film No. 2, discussed in detail below.

Figure 5:
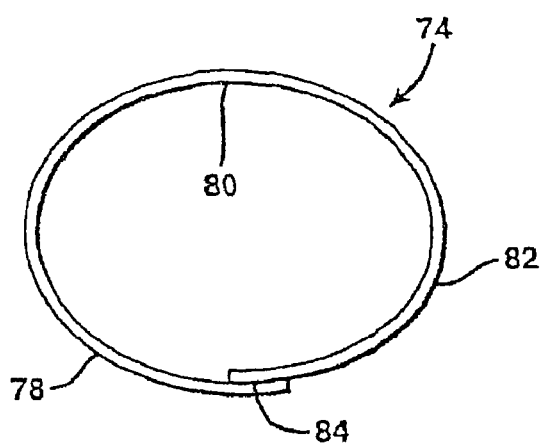
FIG. 5 illustrates a first embodiment of a cross-sectional view through line 5-5 of the packaged product illustrated in FIG. 4.

FIG. 5 illustrates a first cross-sectional view of packaged product 74, i.e., taken through line 5-5 of FIG. 4. FIG. 5 represents a cross-sectional view of a lap-sealed casing comprising film 78 having a coated inside surface region 80, with an uncoated portion heat sealed to outside surface 82 at heat seal 84, the heat seal being located where a first film region overlaps a second film region.

Figure 6:
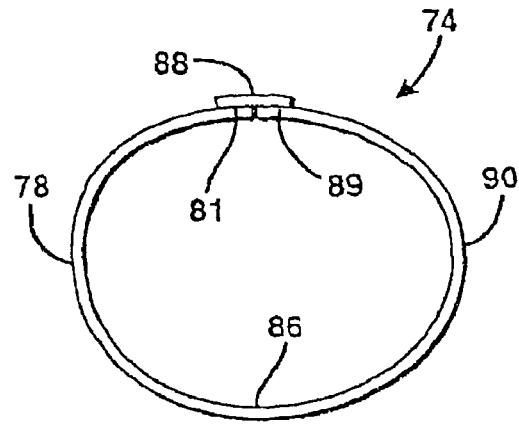
FIG. 6 illustrates a cross-sectional view of an alternative packaged product.

FIG. 6 illustrates an alternative cross-sectional view of packaged product 74, i.e., analogous to the view of FIG. 5 but for a butt-sealed backseamed casing. FIG. 6 represents a cross-sectional view of a butt-sealed backseamed casing comprising film 78 having a coated inside surface region 86. Casing film 78 is heat sealed to butt-seal tape 88. Casing film 78 has inside surface 86 and outside surface 90. Outside surface 90 is heat-sealed to butt-seal tape 88 at seals 81 and 89, where each of the edges of casing film 78 are abutted in close proximity to one another. In this manner, butt-seal tape 88 provides a longitudinal seal along the length of butt-sealed casing film 78. Although butt-seal tape 88 can be made from a monolayer film or a multilayer film, preferably butt-seal tape 88 is made from a multilayer film.

Figure 7:
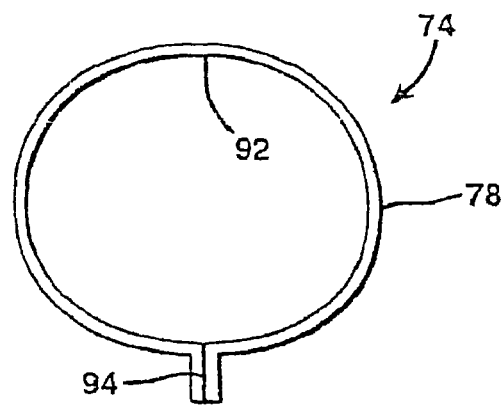
FIG. 7 illustrates a cross-sectional view of another alternative packaged product.

FIG. 7 illustrates a cross-sectional view of a third alternative of packaged product 74, i.e., a fin-sealed backseamed casing. In FIG. 7, fin-sealed casing film 78 has a coated inside surface region 92. Along the edges of the inside surface of casing film 78 are two uncoated regions which are heat sealed to one another at seal 94, which forms a "fin" which extends from casing 74.

Figure 8:
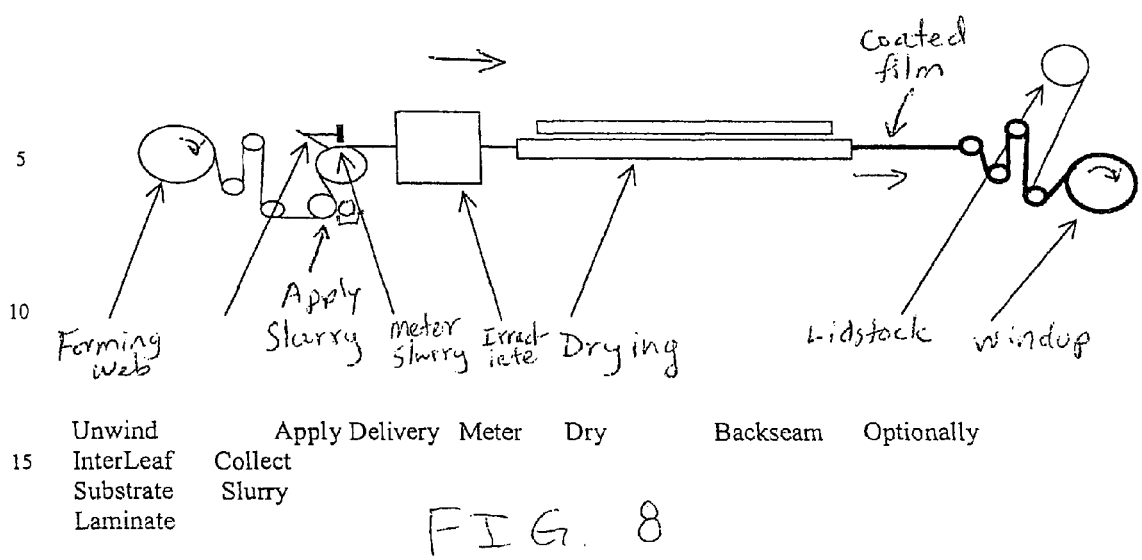
FIG. 8 illustrates a schematic view of a process for coating a substrate film to make the additive delivery laminate of the invention.

In the packaging process resulting in the packaged product illustrated in FIG. 8, a forming web and a non-forming web can be fed from two separate rolls, with the forming web being fed from a roll mounted on the bed of the machine for forming the package "pocket," i.e., the product cavity. The non-forming (lidstock) web is usually fed from a top-mounted arbor for completing the airtight top seal of the package. Each web has its meat-contact/sealant surface oriented towards the other, so that at the time of sealing, the sealant surfaces face one another. The forming web is indexed forward by transport chains, and the previously sealed package pulls the upper non-forming web along with the bottom web as the machine indexes.

The polymer components used to fabricate multilayer films according to the present invention may also contain appropriate amounts of other additives normally included in such compositions. These include slip agents such as talc, antioxidants, fillers, pigments and dyes, radiation stabilizers, antistatic agents, elastomers, and the like additives, as known to those of skill in the art of packaging films.

Although the laminate useful in the present invention need not be crosslinked, in at least one embodiment, one or more layers of the laminate are crosslinked. Crosslinking may be accomplished by conventional methods including irradiation and the addition of chemical crosslinking agents, as for instance agents initiating free radical reactions when heated or exposed to actinic radiation. In irradiation crosslinking, the laminate is subjected to an energetic radiation treatment, such as corona discharge, plasma, flame, ultraviolet, X-ray, gamma ray, beta ray, and high energy electron treatment, which may alter the surface of the film and/or induce crosslinking between molecules of the irradiated material. The irradiation of polymeric films is disclosed in U.S. Pat. No. 4,064,296, to BORNSTEIN, et. al., which is hereby incorporated in its entirety, by reference thereto. BORNSTEIN, et. al. discloses the use of ionizing radiation for crosslinking polymer present in the film.

Radiation dosages are referred to herein in terms of the radiation unit "RAD", with one million RADS, also known as a megarad, being designated as "MR", or, in terms of the radiation unit kiloGray (kGy), with 10 kiloGray representing 1 MR, as is known to those of skill in the art. To produce crosslinking, the polymer is subjected to a suitable radiation dosage of high energy electrons, preferably using an electron accelerator, with a dosage level being determined by standard dosimetry methods. A suitable radiation dosage of high energy electrons is in the range of up to about 16-166 kGy, more preferably about 30-139 kGy, and still more preferably, 50-100 kGy. Preferably, irradiation is carried out by an electron accelerator and the dosage level is determined by standard dosimetry methods. The radiation is not limited to electrons from an accelerator since any ionizing radiation may be used. A preferred amount of radiation is dependent upon the laminate and its end use.

The laminate of the present invention can also be corona treated. As used herein, the phrases "corona treatment" refers to subjecting the surfaces of thermoplastic materials, such as polyolefins, to corona discharge, i.e., the ionization of a gas such as air in close proximity to a film surface, the ionization initiated by a high voltage passed through a nearby electrode, and causing oxidation and other changes to the film surface, such as surface roughness.

The invention is illustrated by the following examples, which are provided for the purpose of representation, and are not to be construed as limiting the scope of the invention. Unless stated otherwise, all percentages, parts, etc. are by weight.

Preparation of Substrate Film No. 1

A 5¾" wide (lay-flat dimension) tube, called a "tape", was produced by the coextrusion process described above and illustrated in FIG. 1, wherein the film cross-section (from inside to outside of the tube) was as follows:

TABLE 1

| Layer Function(s) and Arrangement | Layer Composition | Layer Thickness (mils) |
|---|---|---|
| seal | blend of 70% LLDPE#1 and 30% EAA#1 | 3.2 |
| strength | blend of 80% EVA#1 and 20% HDPE#1 | 3.5 |
| tie | anhydride-grafted LLDPE#2 | 0.9 |
| $O_2$-barrier | 100% EVOH | 1.0 |
| strength and moisture barrier | blend of 50% Nylon#1 and 50% Nylon#2 | 1.7 |
| tie | anhydride-grafted LLDPE#2 | 1.6 |
| strength and balance | blend of 70% EVA#1 and 30% EAA#1 | 3.1 |
| outside | LLDPE#1 | 2.8 | wherein:
LLDPE#1 was DOWLEX ® 2244A, linear low density polyethylene, obtained from Dow Plastics, of Freeport, Texas;
EAA#1 was PRIMACOR ® 1410 ethylene/acrylic acid copolymer obtained from Dow Plastics, of Freeport, Texas. This copolymer had a acrylic acid content of 9.5% by wt. and a melt index of 1.5;
EVA#1 was PE 5269T (TM) ethylene vinyl acetate copolymer, obtained from Chevron Chemical Company, of Houston, Texas;
HDPE#1 was FORTIFLEX ® J60-500C-147 high density polyethylene, obtained from Solvay Polymers, Inc., Deer Park, Texas;
LLDPE#2 was TYMOR ® 1203 linear low density polyethylene having an anhydride functionality grafted thereon, obtained from Morton International, of Chicago, Illinois;
EVOH was EVAL ® LC-E105A polymerized ethylene vinyl alcohol, obtained from Eval Company of America, of Lisle, Illinois;

TABLE 1-continued

| Layer Function(s) and Arrangement | Layer Composition | Layer Thickness (mils) |
|---|---|---|

NYLON#1 was ULTRAMID ® B4 polyamide 6, obtained from BASF corporation of Parsippany, New Jersey;
NYLON#2 was GRILON ® CF6S polyamide 6/12, obtained from EMS-American Grilon Inc., of Sumter, S.C.;

All the resins were coextruded at between 380° F. and 500° F., and the die was heated to approximately 420° F. The extruded tape was cooled with water and flattened, the flattened width being 5¾ inches wide in a lay flat configuration. The tape was then passed through a scanned beam of an electronic cross-linking unit, where it received a total passage of about 64 kilo grays (kGy). After irradiation, the flattened tape was passed through hot water (approximately 206° F. to 210° F.) for about 20 seconds. The resulting heated tape was inflated into a bubble and oriented (while the tape was at a temperature above the vicat softening point of one or more of the polymers therein, but while the polymers remained in the solid state) into a film tubing having a lay-flat width of 16½ inches and a total thickness of about 2.4 mils. The bubble was stable and the optics and appearance of the film were good. The film tubing was determined to have about 20% free shrinkage in the longitudinal direction and about 30% free shrinkage in the transverse direction, when immersed in hot water for about 10 minutes, the hot water being at a temperature of 185° F., i.e., using ASTM method D2732-83. The resulting tubing was slit into film.

Preparation of Substrate Film No. 2

A 2.4 mil film was made slitting a tubing made by the process of FIG. 1, the tubing having the following structure:

TABLE 2

| Layer Function(s) and Arrangement | Layer Composition | Layer Thickness (mils) |
|---|---|---|
| inside and seal | blend of Nylon#3 (50%) and Nylon#2 (50%) | 0.48 |
| bulk | blend of 80% EVA#1 and 20% EAO#1 | 0.50 |
| tie | anhydride-grafted LLDPE#2 | 0.15 |
| O$_2$-barrier | EVOH | 0.15 |
| tie | anhydride-grafted LLDPE#2 | 0.15 |
| abuse and bulk | blend of 80% EVA#1 and 20% LLDPE#3 | 0.97 |

NYLON#3 was VESTAMID (TM) Z7319 polyamide 12, obtained from Huls America, Inc., of Piscataway, N.J.;
LLDPE#3 was DOWLEX ® 2045.03 linear low density polyethylene, obtained from Dow Plastics, of Freeport, Texas;
EAO#1 was EXACT 4011 (TM) homogeneous ethylene/alpha-olefin copolymer, obtained from the Exxon Chemical Company, of Baytown, Texas; otherwise, each of the resins was as identified in Film No. 1, above.

Preparation of Substrate #3

A 2.5 mil film is made by the extruding a single layer of HDPE#1 using an upward blown film process.

Preparation of Additive Delivery Laminate

To prepare the additive delivery layer, solvent, thermoplastic polymer and granular additive agent were combined to provide a coating slurry. In general, about a 1:4 mixture of granular flavor and/or color agent to rubber solution is appropriate to provide the desired viscosity and flavorant and/or colorant level. A portion of the rubber material was removed from a bale using a utility knife, rubber bale cutter or a band saw, and chopped up. Alternatively, one may use shredding machinery suitable for industrial processing of rubber, such as Mitts & Merrill Wood Hogs or Cumberland Plastics Granulators, or a Banbury mixer. The Banbury mixer is useful when compounding release additives or other polymers to produce the rubber component of a coating slurry. The chopped rubber component was dissolved with heating and stirring into a hydrocarbon solvent such as heptane to create a rubber solution. Flavor, aroma, and/or color granules were added to the rubber solution to produce a slurry.

In general the granules were added at a level of from about 20 to 70 weight percent, based on total weight of the rubber solution. However, higher loading of the granular agent could have been utilized. The slurry was applied to a film substrate and the solvent was removed to produce the additive delivery coating. In general, the granules were present in the dried additive layer at a level of from about 50 to 85 weight percent, such as 60 to 80 weight percent, such as 70 to 75 weight percent, based on total weight of the additive layer. The coated film substrate was backseamed with the coating facing inside to make casing tubing. The casing tubing was closed at one end using metal clips or another sealing method such as heat sealing, and a food product was then loaded into the clipped casing after which the other end of the casing tubing was closed to form a packaged product.

Those of skill in the art will appreciate that a variety of formulations can be made to produce different flavor and color effects.

EXAMPLE 1

A portion of Exxon Butyl 007 rubber (a copolymer of isobutylene and isoprene) was removed from a bale and cut into small pellet-sized pieces by first cutting strips using a utility knife and thereafter cutting the strips into small pellets using scissors. A 10 wt. % butyl rubber solution was prepared by placing 50 grams of the chopped Exxon Butyl 007 in a glass container with 450 grams of heptane and heating (to approximately 75° C.) with agitation until the butyl rubber was fully dissolved into the heptane. To the 10 weight percent butyl rubber solution was added 93 grams of Chardex Hickory D-040 granular smoke flavor obtained from Red Arrow Products Co., Inc., of Manitowoc, Wis. and 32 grams of granular Caramel #603 obtained from D.D. Williamson and Company, Inc., of Louisville, Ky. The coating mixture was stirred or shaken to result in a well-dispersed, viscous slurry.

Six grams of the slurry was applied down the length of a 12-inch by 18-inch flat sheet of a multilayer film having the structure: LLDPE/EVA-HDPE/TIE/N6/EVOH/TIE/EVA-HDPE/LLDPE. This film was available from Cryovac, Inc., of Duncan, S.C., and is available as "F090" film. A printing draw down bar, set at a 4 mil clearance, was pulled slowly down the length of the film until all the slurry was applied evenly to the substrate. However approximately ¼ inch of each of the length of film was uncoated to provide an area for heat sealing. The heptane was evaporated using forced air to provide the additive delivery coating which contained the water-insoluble isobutylene/isoprene thermoplastic polymer rubber impregnated with 25% smoke concentrate granules. The dried coating contained about 71% smoke granules and about 29% butyl rubber. The dried coating exhibited good resistance to flaking.

The coated sheet was folded with the additive delivery layer facing inward to align the uncoated portion of the substrate layer of the film. The aligned edges were then heat sealed into a tube using a Vertrod sealer, to produce a fin-sealed casing. The additive delivery coated surface faced to the inside of the tube.

The meat and the added ingredients were blended in a vacuum mixer at 4° C. for at least 45 minutes. The tubular film was clipped on one end using a Tipper Clipper® machine obtained from the Tipper Tie Inc., of Apex, N.C. The clipped backseamed casing was then filled with a meat emulsion of raw chopped ham using a mechanical piston stuffer, taking care to minimize air entrapment. The open end of the filled casing was then clipped closed as with the first closure on a Tipper Tie press clipper, to produce an uncooked casing. The filled and clipped casings (i.e., chubs) typically measured 23 to 25 cm in circumference, and 20 to 40 cm in length.

Stuffed casings were transported to a cooking vessel. The casings were processed using a stepped cook cycle: i.e., heating at 135° F. for 30 minutes, followed by heating at 150° F. for 30 minutes, followed by heating at 160° F. until an internal temperature of 145-150° F. was reached. After cooking, the product was chilled by a cold water shower for at least 10 minutes and immediately placed in a refrigerated area for complete chilling. The product was refrigerated overnight before stripping away coated-casing for visual and/or organoleptic testing.

Upon stripping the film from the meat, there was no meat pull-off, the level of purge was very low, and it was found that excellent depth of color and flavor had been delivered to the meat product.

EXAMPLE 2

A coating mixture was prepared using the procedure of Example 1, except the 50 grams of Exxon Vistanex® MM L-80 polyisobutylene (PIB) was used in place of in place of the Exxon Butyl Rubber 007 and was heated and agitated with 450 grams of heptane used to produce the butyl rubber/heptane solution.

EXAMPLES 3-8

The procedure of Examples 1 and 2 was followed except that the concentrations of Butyl rubber 007 or PIB rubber and the level of powdered smoke flavorant were altered. The formulations for the additive delivery layer for Examples 3-8 are summarized in Table 1, below. Each formulation resulted in acceptable flavor transfer to the food product.

TABLE 1

| | Parts by wt.; (%) | | | | | |
|---|---|---|---|---|---|---|
| Ingredient | Ex. 3 | Ex. 4 | Ex. 5 | Ex. 6 | Ex. 7 | Ex. 8 |
| Butyl 007 | 1 | 1 | — | — | 1 | — |
| L-80 PIB | — | — | 1 | 1 | — | 1 |
| Heptane | 4 | 5.67 | 4 | 5.67 | 9 | 9 |
| Chardex D-40 | 1.25 | 1.67 | 1.25 | 1.67 | 2.5 | 2.5 |

The compositions in Table 1 with varying amounts of rubber (smoke powder concentration kept constant at about 20 wt. % of total) were coated onto Cryovac F090 film using an adjustable coating rod set at 4 mils clearance and allowed to air dry. All the examples in Table 1 dried to a coating that had good adhesion and abuse characteristics as measured by 600-tape adhesion, fingernail scrape resistance and "crinkle" resistance. The smoke flavor transferred to the meat at cook-in conditions while the rubber binder remained adhered to the film.

EXAMPLES 9-12

10% Butyl rubber solutions in heptane were prepared as in Example 1. Granular smoke flavorant and release agents were added to the solution to provide flavorant slurries for the Examples in Table 2. The addition of wax improved the slip property of the dried flavor transfer coating, and reduced the tendency of the coating to attach to a cooked food product when stripping away casing for slicing. Alternatively, waxes and other release agents may be applied as an overcoat to a dried additive delivery coating.

TABLE 2

| | Slurry Formulation (parts by wt.) | | | |
|---|---|---|---|---|
| Material | Ex. 9 | Ex. 10 | Ex. 11 | Ex. 12 |
| 10:90 Butyl 007:heptane Solution | 10 | 10 | 10 | 10 |
| Chardex D-040 smoke granules | 2.5 | 2.5 | 2.5 | 2.5 |
| Kemamide E-60 | 0.66 | — | 0.27 | — |
| Microthene FE-532-00 | — | 0.66 | — | 0.27 |

The formulations from Table 2 were coated as in Example 3. The dried coatings of 1 to 4 exhibited good slip, abrasion resistance and no surface tack. Examples 10 and 12 demonstrated no noticeable "pick-off" of coating by meat as compared to Example 7, yet provided comparable flavor donation to the cooked ham.

Although the present invention has been described with reference to particular means, materials, and embodiments, it should be noted that the invention is not to be limited to the particulars disclosed, and extends to all equivalents of the expressly claimed subject matter.

What is claimed is:

1. A laminate comprising:
   (A) a substrate layer; and
   (B) an additive delivery layer comprising:
      (i) a water-insoluble thermoplastic polymer, and
      (ii) water-soluble granules consisting essentially of at least one member selected from the group consisting of colorant, flavorant, and odorant wherein the granules have a particle size of from about 10 to about 500 microns.

2. The laminate according to claim 1, wherein the additive delivery layer is an outer layer of the laminate.

3. The laminate according to claim 1, wherein some of the granules extend above the surface of the thermoplastic polymer.

4. The laminate according to claim 1, wherein at least some of the water-soluble granules are embedded in the thermoplastic polymer in the additive delivery layer.

5. The laminate according to claim 1, wherein the granules are present in the additive delivery layer at a level of from about 50 to about 85 weight percent, based on total weight of the additive delivery layer.

6. The laminate according to claim 1, wherein the thermoplastic polymer in the additive delivery layer comprises at least one member selected from the group consisting of butadiene/styrene copolymer, isobutylene/isoprene copolymer, polyisoprene, polyisobutylene, ethylene/vinyl acetate copolymer, ethylene/vinyl alcohol copolymer, ethylene/propylene copolymer, polybutadiene, polyethylene, polypropylene, polyvinyl acetate, cellulose triacetate, natural rubber, chicle, and balata rubber.

7. The laminate according to claim 1, wherein the substrate layer comprises a thermoplastic polymer selected from the group consisting of polyethylene, ethylene/alpha-olefin copolymer, polypropylene, propylene/alpha-olefin copolymer, ethylene/vinyl acetate copolymer, ethylene/ethylenically-unsaturated esters, ethylene/alpha, beta-unsaturated carboxylic acid, ethylene/alpha, beta-unsaturated carboxylic acid anhydride, metal base neutralized salt of ethylene/alpha, beta-unsaturated carboxylic acid, ethylene/cyclo-olefin copolymer, ethylene/vinyl alcohol copolymer, polyamide, co-polyamide, polyester, co-polyester, polystyrene, and cellulose.

8. The laminate according to claim 1, further comprising an overcoat layer over the additive delivery layer, the overcoat layer comprising at least one member selected from the group consisting of polysaccharide and protein, with the additive delivery layer being between the substrate layer and the overcoat layer.

9. The laminate according to claim 8, wherein the overcoat layer is a water-soluble layer.

10. The laminate according to claim 8, wherein the overcoat layer comprises at least one member selected from the group consisting of alginate, methyl cellulose, hydroxypropyl starch, hydroxypropylmethyl starch, hydroxymethyl cellulose, hydroxypropyl cellulose, hydroxypropylmethyl cellulose, carboxymethyl cellulose, cellulose esterified with 1-octenyl succinic anhydride, chitin, chitosan, gliadin, glutenin, globulin, albumin, prolamin, thrombin, pectin, canageenan, konjac flour-glucomannin, fibrinogen, casein, soy protein, whey protein, and wheat protein.

11. The laminate according to claim 8, wherein the overcoat layer comprises hydroxypropyl cellulose.

12. A packaging article comprising a laminate which is adhered to itself or another component of the packaging article, wherein the laminate comprises:
(A) a substrate layer; and
(B) an additive delivery layer comprising:
(i) a water-insoluble thermoplastic polymer, and
(ii) water-soluble granules consisting essentially of at least one member selected from the group consisting of colorant, flavorant, and odorant wherein the granules have a particle size of from about 10 to about 500 microns.

13. The packaging article according to claim 12, wherein the packaging article comprises a member selected from the group consisting of bag, pouch, casing, tray, and lidding film.

14. The packaging article according to claim 13, wherein the packaging article comprises a casing selected from the group consisting of seamless casing, fin-sealed backseamed casing, lap-sealed backseamed casing, and butt-sealed backseamed casing with backseaming tape thereon.

15. The packaging article according to claim 12, wherein the laminate exhibits a free shrink at 90° C. of at least 5 percent in each direction.

16. A laminate suitable for cooking foods comprising:
(A) a substrate layer; and
(B) an additive delivery layer, the additive delivery layer comprising:
(i) a water-insoluble thermoplastic polymer; and
(ii) water-soluble granules consisting essentially of at least one additive selected from the group consisting of colorant, flavorant, and odorant wherein the granules have a particle size of from about 10 to about 500 microns;
wherein the additive is present in an amount sufficient to impart color, flavor, and/or odor to a food when the laminate contacts the food product during elevated temperature processing of the food product.

17. The laminate according to claim 16, wherein the additive delivery layer is a porous layer.

18. The laminate according to claim 16, wherein the substrate layer comprises thermoplastic polymer which is heat sealable.

19. The laminate according to claim 16, wherein the laminate exhibits a free shrink at 90° C. of at least 5% in each direction.

20. The laminate according to claim 16, wherein the thermoplastic polymeric material comprises at least one member selected from the group consisting of butadiene/styrene copolymer, isobutylene/isoprene copolymer, polybutylene, polypolyisoprene, polyisobutylene, styrene/isobutylene copolymer, ethylene/vinyl acetate copolymer, ethylene/propylene copolymer, polybutadiene, polyethylene, ethylene/alpha-olefin copolymer, ethylene/cyclo-olefin copolymer, polypropylene, polyvinyl acetate, cellulose triacetate, natural rubber, chicle, balata rubber.

21. The laminate according to claim 16, wherein the additive delivery layer further comprises a release agent comprising at least one member selected from the group consisting of petroleum wax, paraffin, beeswax, amide wax, antifog agent, vegetable oil, lard, mineral oil, and oxidized polyethylene.

22. The laminate according to claim 16, wherein the additive delivery layer is crosslinked.

23. The laminate according to claim 16, wherein the substrate layer comprises at least two layers, with one of the at least two layers comprising at least one member selected from the group consisting of polyolefin, ionomer, polyamide, polyester, ethylene/vinyl alcohol copolymer, ethylene/acrylic acid copolymer, ethylene/vinyl acetate copolymer, and vinylidene chloride copolymer.

* * * * *